United States Patent
Wang et al.

(10) Patent No.: US 10,865,287 B1
(45) Date of Patent: Dec. 15, 2020

(54) PROCESS FOR MANUFACTURING AN ULTRA-HIGH THERMALLY CONDUCTIVE GRAPHENE CURING BLADDER

(71) Applicant: SHANDONG LINGLONG TYRE CO., LTD., Zhaoyuan (CN)

(72) Inventors: Feng Wang, Zhaoyuan (CN); Haitao Sui, Zhaoyuan (CN); Liqiang Dong, Zhaoyuan (CN); Haiying Li, Zhaoyuan (CN); Gaoquan Hu, Zhaoyuan (CN); Xiaogang Ma, Zhaoyuan (CN); Tao Sun, Zhaoyuan (CN); Rubin Zhuang, Zhaoyuan (CN)

(73) Assignee: SHANDONG LINGLONG TYRE CO., LTD., Zhaoyuan (CN)

( * ) Notice: Subject to any disclaimer, the term of this patent is extended or adjusted under 35 U.S.C. 154(b) by 0 days.

(21) Appl. No.: 16/766,754

(22) PCT Filed: Aug. 22, 2018

(86) PCT No.: PCT/CN2018/101785
§ 371 (c)(1),
(2) Date: May 26, 2020

(87) PCT Pub. No.: WO2019/105072
PCT Pub. Date: Jun. 6, 2019

(30) Foreign Application Priority Data

Nov. 30, 2017 (CN) .......................... 2017 1 1237424

(51) Int. Cl.
| | | |
|---|---|---|
| C08K 3/04 | (2006.01) | |
| C09K 5/14 | (2006.01) | |
| C08L 23/22 | (2006.01) | |
| B29C 48/00 | (2019.01) | |
| B29C 48/02 | (2019.01) | |

(52) U.S. Cl.
CPC .......... *C08K 3/042* (2017.05); *B29C 48/0011* (2019.02); *B29C 48/022* (2019.02); *C08L 23/22* (2013.01); *C09K 5/14* (2013.01); *C08K 2201/001* (2013.01); *C08L 2201/08* (2013.01)

(58) Field of Classification Search
CPC .... C08K 3/042; C08K 2201/001; C09K 5/14; C08L 23/22; C08L 2201/08; B29C 48/0011; B29C 48/022
USPC ........................................................ 524/495
See application file for complete search history.

(56) References Cited

U.S. PATENT DOCUMENTS

2011/0284795 A1* 11/2011 Sakurai ................... D01F 9/145
252/75

FOREIGN PATENT DOCUMENTS

| CN | 103627179 A | * | 3/2014 |
|---|---|---|---|
| CN | 103627179 A | | 3/2014 |
| CN | 105622983 A | * | 6/2016 |
| CN | 105837963 A | * | 8/2016 |
| CN | 105837963 A | | 8/2016 |
| CN | 106633437 A | * | 5/2017 |
| CN | 106633437 A | | 5/2017 |
| CN | 107163315 A | * | 9/2017 |
| CN | 107163315 A | | 9/2017 |
| CN | 108084974 A | | 5/2018 |
| EP | 2392701 A1 | | 12/2011 |

OTHER PUBLICATIONS

Shanghai Economic Commission, Workers' Job Specification Manual (Competence Knowledge Chemical, Medicine and Refinery), Jul. 31, 1990, p. 627, Shanghai Science Popularization Press.
Wanjing Li, Tire product process, Jun. 30, 1993, p. 47-48, Chemical Industry Press.

* cited by examiner

*Primary Examiner* — Michael Bernshteyn
(74) *Attorney, Agent, or Firm* — Bayramoglu Law Offices LLC

(57) ABSTRACT

A process for manufacturing an ultra-high thermally conductive graphene curing bladder includes the following steps: (1) pre-mixing an ultra-high thermally conductive graphene with rubber to obtain a pre-dispersed graphene master batch, performing a granulation process or a cutting process on the pre-dispersed graphene master batch to obtain a granular solid or a sheet solid, mixing the solid in a rubber mixing mill to obtain an ultra-high thermally conductive graphene rubber compound; (2) extruding, by an extruding machine, the ultra-high thermally conductive graphene rubber compound into a rubber strip of a desirable size; weighing and fixed-length processing the rubber strip of the ultra-high thermally conductive graphene rubber compound to obtain a rubber blank, placing the rubber blank into a pressing type curing bladder mold, closing the mold, pressurizing, heating and curing to obtain a finished product of the ultra-high thermally conductive graphene curing bladder.

2 Claims, No Drawings

PROCESS FOR MANUFACTURING AN ULTRA-HIGH THERMALLY CONDUCTIVE GRAPHENE CURING BLADDER

CROSS REFERENCE TO THE RELATED APPLICATIONS

This application is the national phase entry of International Application No. PCT/CN2018/101785, filed on Aug. 22, 2018, which is based upon and claims priority to Chinese Patent Application No. 201711237424.X, filed on Nov. 30, 2017, the entire contents of which are incorporated herein by reference.

TECHNICAL FIELD

The present invention relates to a process for manufacturing an ultra-high thermally conductive graphene curing bladder.

BACKGROUND

Rubber products, especially those for automobile tires, are cured in a curing bladder, and the main constituent of the curing bladder is carbon black reinforced butyl rubber. Such curing bladder has an extremely low thermal conductivity, achieves a poor heat transfer effect and leads to a low curing efficiency. Therefore, it is necessary to put forward effective technical solutions to solve the above problems.

SUMMARY

Technical Issues

In view of the drawbacks in the prior art, the invention provides a manufacturing process of an ultra-high thermally conductive graphene curing bladder. This process can improve the vulcanization rate of products.

Technical Solutions to Solve the Problems

Technical Solutions

The technical solution of the present invention to solve the above-mentioned technical problems is as follows.

A process of manufacturing an ultra-high thermally conductive graphene curing bladder, including the following steps:

(1) pre-mixing an ultra-high thermally conductive graphene with rubber to obtain a pre-dispersed graphene master batch, performing a granulation process or a cutting process on the pre-dispersed graphene master batch to obtain a granular solid or a sheet solid, mixing the solid in a rubber mixing mill to obtain an ultra-high thermally conductive graphene rubber compound;

(2) extruding, by an extruding machine, the ultra-high thermally conductive graphene rubber compound into a rubber strip of a desirable size; weighing and fixed-length processing the rubber strip of the ultra-high thermally conductive graphene rubber compound to obtain a rubber blank, placing the rubber blank into a pressing type curing bladder mold, closing the mold, pressurizing, heating and curing to obtain a finished product of the ultra-high thermally conductive graphene curing bladder.

Preferably, the ultra-high thermally conductive graphene and the rubber are pre-mixed in the weight ratio of (0.1-10):1.

Advantages

The present invention has greatly improved the thermal conductivity of a curing bladder and accelerated heat transfer, so that the vulcanization efficiency of products is improved. Compared with the prior art, the thermal conductivity of the curing bladder of the present invention can be increased by 50% to 10,000%, and the service life of the curing bladder of the present invention can be increased by 30% to 3,000%. The use of the ultra-high thermally conductive curing bladder can shorten the vulcanization time of the product, reduce the replacement times of the curing bladder and the shutdown time caused thereby. The vulcanization efficiency of the product can be increased by 20% to 100% and the product quality defects caused by damage of the curing bladder can be reduced.

DETAILED DESCRIPTION OF THE EMBODIMENTS

The present invention provides a process for manufacturing an ultra-high thermally conductive graphene curing bladder, including the following steps.

(1) Pre-dispersed graphene master batch is prepared by pre-mixing ultra-high thermally conductive graphene with rubber, and subjected to a granulation process or a cutting process to obtain a granular solid or a sheet solid, and the solid is mixed in a rubber mixing mill to obtain the ultra-high thermally conductive graphene rubber compound.

(2) The rubber strip of a desirable size is obtained by extruding by the ultra-high thermally conductive graphene rubber compound through a extruding machine; the rubber strip of the ultra-high thermally conductive graphene is weighed and fixed-length processed to obtain a rubber blank, and the rubber blank is placed into a pressing type curing bladder mold for mold closing, pressurizing, heating and curing to obtain the finished ultra-high thermally conductive graphene curing bladder.

As an embodiment of the present invention, the ultra-high thermally conductive graphene is pre-mixed with the rubber in the weight ratio of (0.1-10):1.

Graphene is a honeycomb planar film formed by $sp^2$ hybridization (see https://courses.lumenlearning.com/intro-chem/chapter/sp2-hybridization/) of carbon atoms. Graphene is a quasi-two-dimensional material with only one atomic layer thickness. Graphene, discovered and prepared so far, is the nanomaterial having the highest strength and most excellent electric and thermal conductivity. The present invention can overcome the drawbacks that a curing bladder made of butyl rubber compound has poor thermal conductivity and low tensile strength by introducing graphene into the material for making the curing bladder, because the graphene possesses the characteristics of ultra-high mechanical strength, ultra-high thermal conductivity and high specific surface area. Therefore, the curing bladder with ultra-high thermal conductivity, high strength, high temperature resistance, aging resistance and low permeability is obtained.

The thermal conductivity of graphene is compared with that of common materials as follows:

TABLE 1

| Name of Material | Graphene | Butyl Rubber | Curing bladder rubber compound | Ferrum (Fe) |
|---|---|---|---|---|
| Thermal Conductivity, W/m.K | 5300 | 0.09 | 0.2-0.3 | 80 |

It can be seen from the table that the thermal conductivity of graphene is 58,888 times that of pure butyl rubber, more than 20,000 times that of curing bladder rubber compound, and even more than 100 times that of ferrum.

The graphene of the present invention can also be directly mixed or pre-mixed into solution to prepare ultra-high thermally conductive graphene rubber compound. The direct mixing method specifically includes: weighing the ultra-high thermally conductive graphene according to the pre-determined proportion, and directly mixing the ultra-high thermally conductive graphene with curing bladder rubber in a rubber mixing mill to prepare the ultra-high thermally conductive graphene rubber compound. The pre-mixed graphene solution method specifically includes: mixing graphene solution with carbon black, zinc oxide and other powder materials uniformly, then drying sufficiently to evenly adsorb and disperse the graphene into powder materials to obtain pre-mixed graphene powders, weighing the pre-mixed graphene powders according to the predetermined proportion, and mixing the pre-mixed graphene powders with curing bladder rubber in a rubber mixing mill to obtain the ultra-high thermally conductive graphene rubber compound.

The ultra-high thermally conductive graphene rubber compound can also be used to prepare the ultra-high thermally conductive graphene curing bladder by an injection process. The specific steps include feeding the ultra-high thermally conductive graphene rubber compound strip into the feeding port of the injection-type plastic extruding machine for curing bladders, and initiating the injection-type plastic extruding machine for curing bladders for the automatic plasticization, rubber injection and vulcanization to obtain the finished ultra-high thermally conductive graphene curing bladder.

INDUSTRIAL APPLICABILITY

The present invention can be summarized in other specific forms that do not violate the spirit or main features of the present invention. Therefore, from any point of view, the above-mentioned embodiment of the present invention can only be regarded as an explanation of the invention instead of any limit to the invention. The claims define the scope of the present invention, while the above-mentioned description does not limit the scope of the present invention. Therefore, any change made within the meaning and scope of the claims of the present invention should be considered to be included in the scope of the claim of this invention.

What is claimed is:

1. A process for manufacturing an ultra-high thermally conductive graphene curing bladder, comprising the following steps:
    (1) pre-mixing an ultra-high thermally conductive graphene with rubber to obtain a pre-dispersed graphene master batch, performing a granulation process or a cutting process on the pre-dispersed graphene master batch to obtain a granular solid or a sheet solid, mixing the granular solid or the sheet solid in a rubber mixing mill to obtain an ultra-high thermally conductive graphene rubber compound; and
    (2) extruding, by an extruding machine, the ultra-high thermally conductive graphene rubber compound into a rubber strip; weighing and fixed-length processing the rubber strip of the ultra-high thermally conductive graphene rubber compound to obtain a rubber blank, placing the rubber blank into a pressing type curing bladder mold, closing the pressing type curing bladder mold, pressurizing, heating and curing the rubber blank to obtain a finished product of the ultra-high thermally conductive graphene curing bladder.

2. The process for manufacturing the ultra-high thermally conductive graphene curing bladder according to claim 1, wherein the ultra-high thermally conductive graphene and the rubber are pre-mixed in a weight ratio of (0.1-10):1.

* * * * *